(12) United States Patent
Zhu et al.

(10) Patent No.: US 10,606,467 B2
(45) Date of Patent: Mar. 31, 2020

(54) FIDELITY MANAGEMENT AND TRANSFORMATION OF NOTECARD ITEMS

(71) Applicant: Microsoft Technology Licensing, LLC, Redmond, WA (US)

(72) Inventors: Yibing Zhu, Woodinville, WA (US); Theresa Estrada, Redmond, WA (US); Derik B. Stenerson, Redmond, WA (US); Keith Fournier, II, Bothell, WA (US); Victor Poznanski, Redmond, WA (US); Sian Lindley, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 15/934,591

(22) Filed: Mar. 23, 2018

(65) Prior Publication Data

US 2019/0250788 A1   Aug. 15, 2019

Related U.S. Application Data

(60) Provisional application No. 62/628,813, filed on Feb. 9, 2018.

(51) Int. Cl.
*G06F 17/24* (2006.01)
*G06F 3/0486* (2013.01)
(Continued)

(52) U.S. Cl.
CPC .......... *G06F 3/0486* (2013.01); *G06F 16/168* (2019.01); *G06F 17/241* (2013.01); *G06Q 10/101* (2013.01)

(58) Field of Classification Search
CPC ...................................... G06F 3/0486
(Continued)

(56) References Cited

U.S. PATENT DOCUMENTS 5,606,674 A  *  2/1997  Root ..................... G06F 3/0488
                                                  715/769
6,411,310 B1 *  6/2002  Berquist ............... G06F 3/0481
                                                  715/764

(Continued)

OTHER PUBLICATIONS

Pearson, Jennifer, George Buchanan, Harold Thimbleby, and Matt Jones. "The Digital Reading Desk: A lightweight approach to digital note-taking." Interacting with Computers 24, No. 5 (2012): 327-338. (Year: 2012).*

*Primary Examiner* — Frank D Mills

(57) ABSTRACT

Non-limiting examples of the present disclosure relate to fidelity management of an exemplary notecard item based on action(s) for movement that may re-locate notecard item(s) across any of: different content portions of a digital document, different digital documents of an application/service and digital documents of different applications/services. Specific data (and metadata) is collected and analyzed to enable determination of a level of fidelity for rendering of a notecard item, where a representation of a notecard item is generated to fit a context of a digital document in which the notecard item is being placed. A representation of a notecard item may be rendered at a first level of fidelity in one context but a different level of fidelity when the notecard item is moved to a different context. In other instances, evaluation of a notecard item yields a determination to maintain fidelity after an action that re-locates a notecard item.

20 Claims, 11 Drawing Sheets

(51) Int. Cl.
*G06Q 10/10* (2012.01)
*G06F 16/16* (2019.01)

(58) Field of Classification Search
USPC .......................................... 715/230
See application file for complete search history.

(56) References Cited

U.S. PATENT DOCUMENTS

| | | | | |
|---|---|---|---|---|
| 10,042,832 | B1* | 8/2018 | Vagell | G06F 17/211 |
| 2008/0082932 | A1* | 4/2008 | Beumer | G06F 9/543 |
| | | | | 715/770 |
| 2008/0141153 | A1* | 6/2008 | Samson | G06F 3/0481 |
| | | | | 715/769 |
| 2008/0256113 | A1* | 10/2008 | Rasmussen | G06F 17/2205 |
| 2009/0292987 | A1* | 11/2009 | Sorenson | G06F 9/543 |
| | | | | 715/255 |
| 2015/0186351 | A1* | 7/2015 | Hicks | G06F 17/241 |
| | | | | 715/232 |
| 2016/0321229 | A1* | 11/2016 | Baird | G06F 17/241 |
| 2019/0129939 | A1* | 5/2019 | Hewitt | G06F 17/2785 |

* cited by examiner

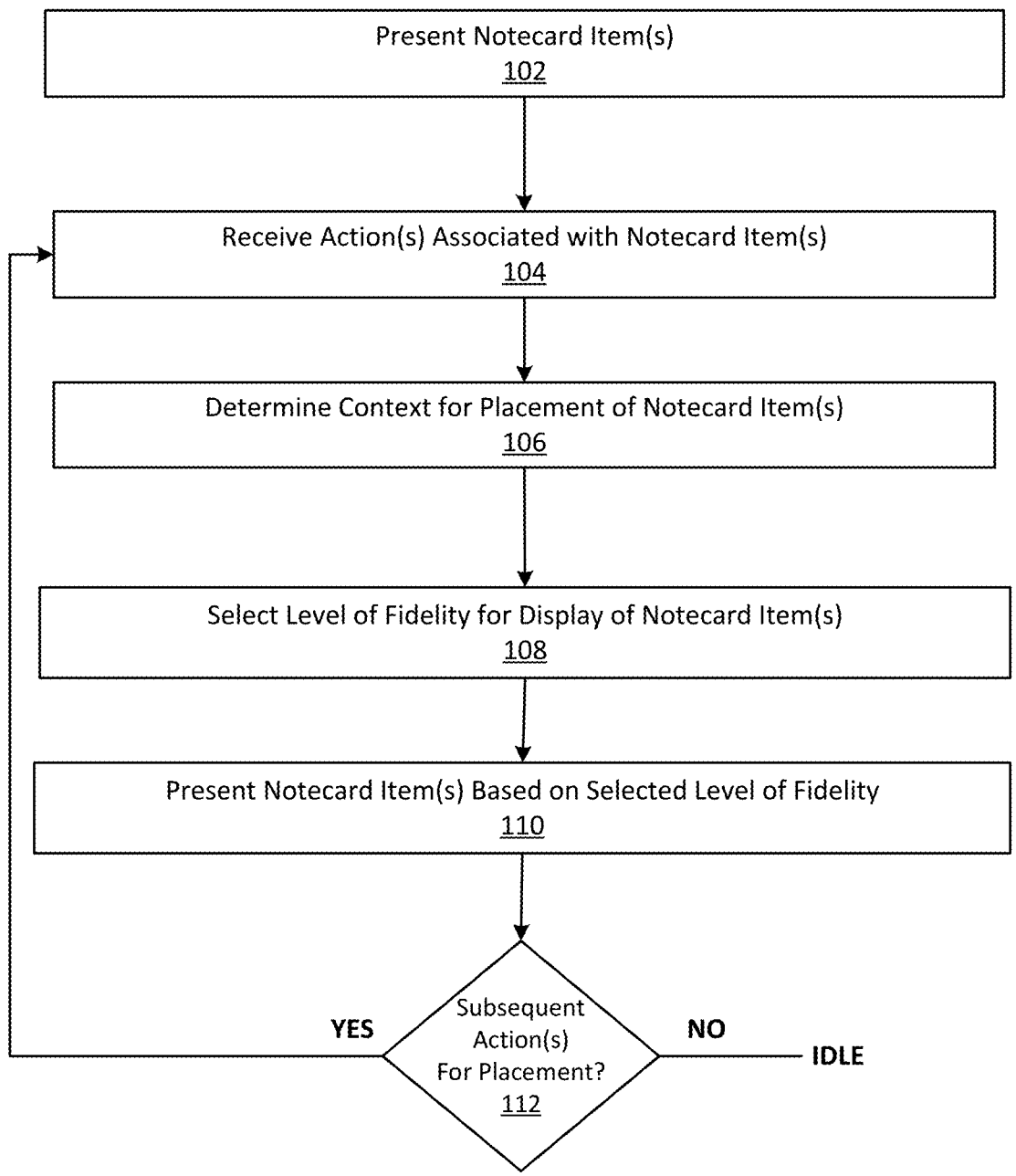

FIG. 2A
200
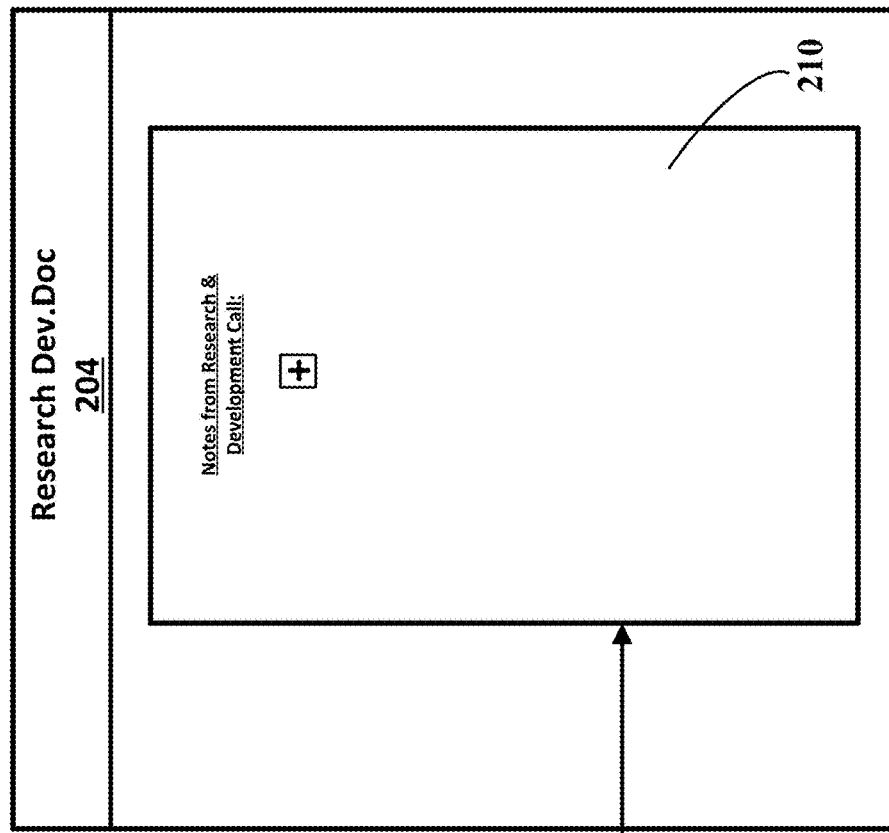
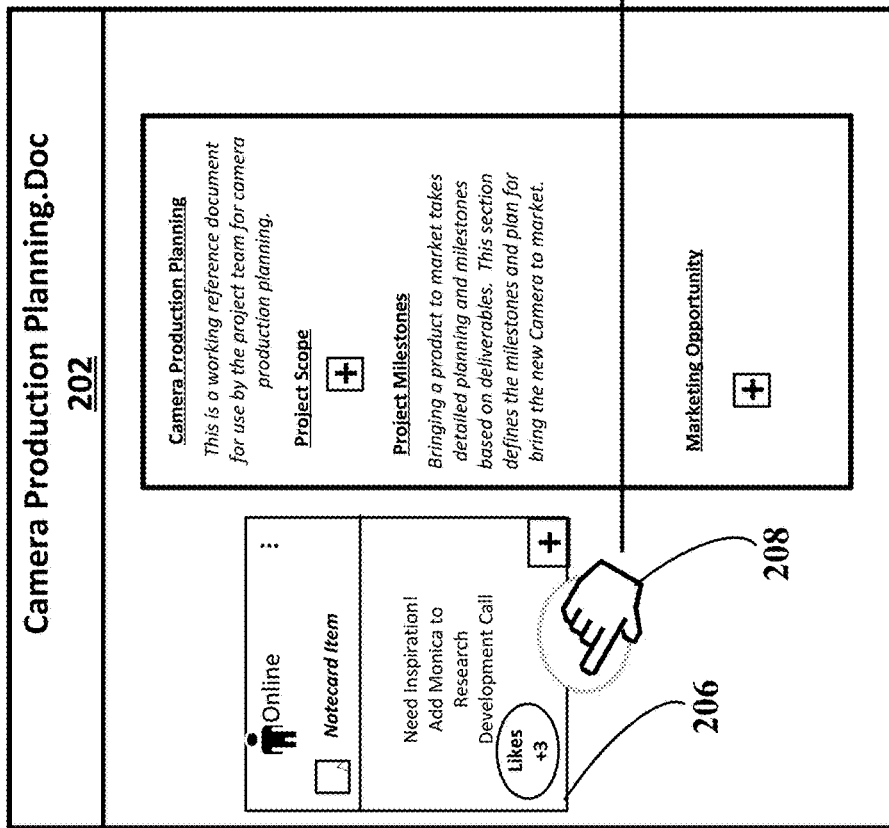

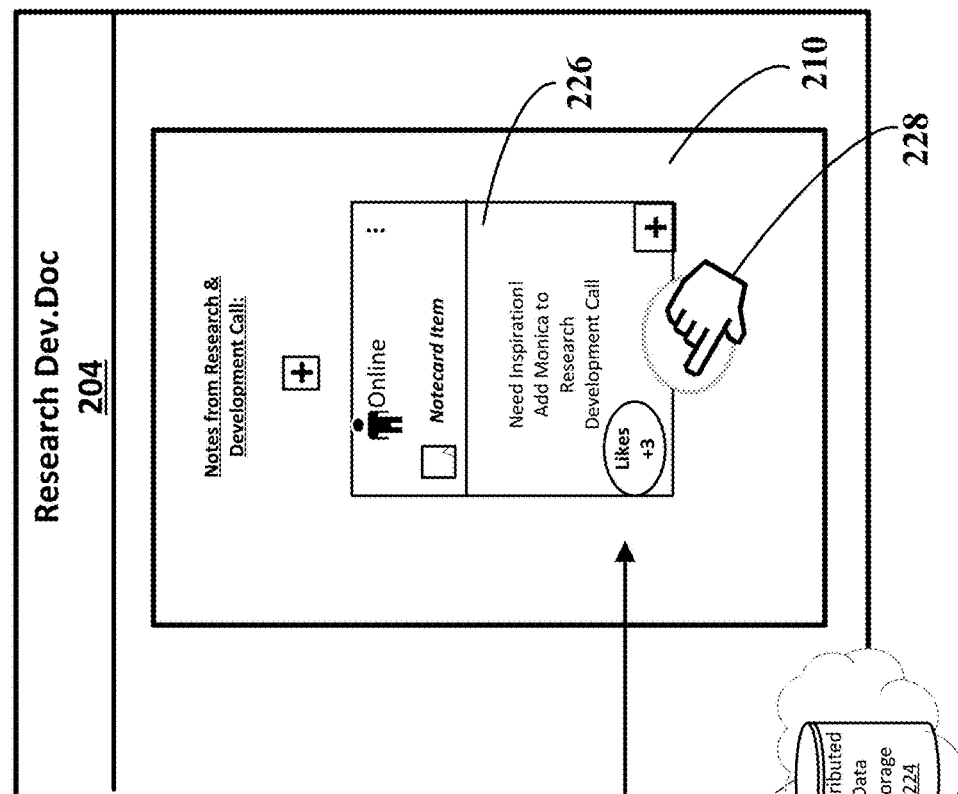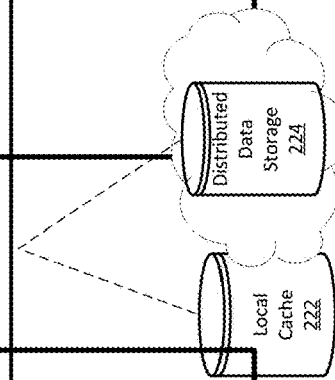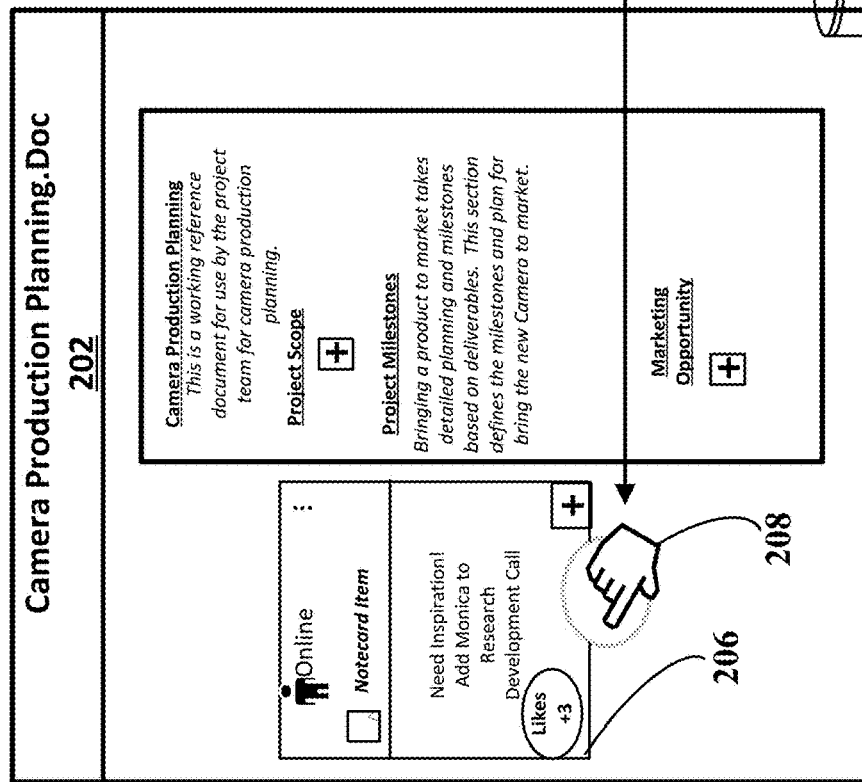
FIG. 2B
220

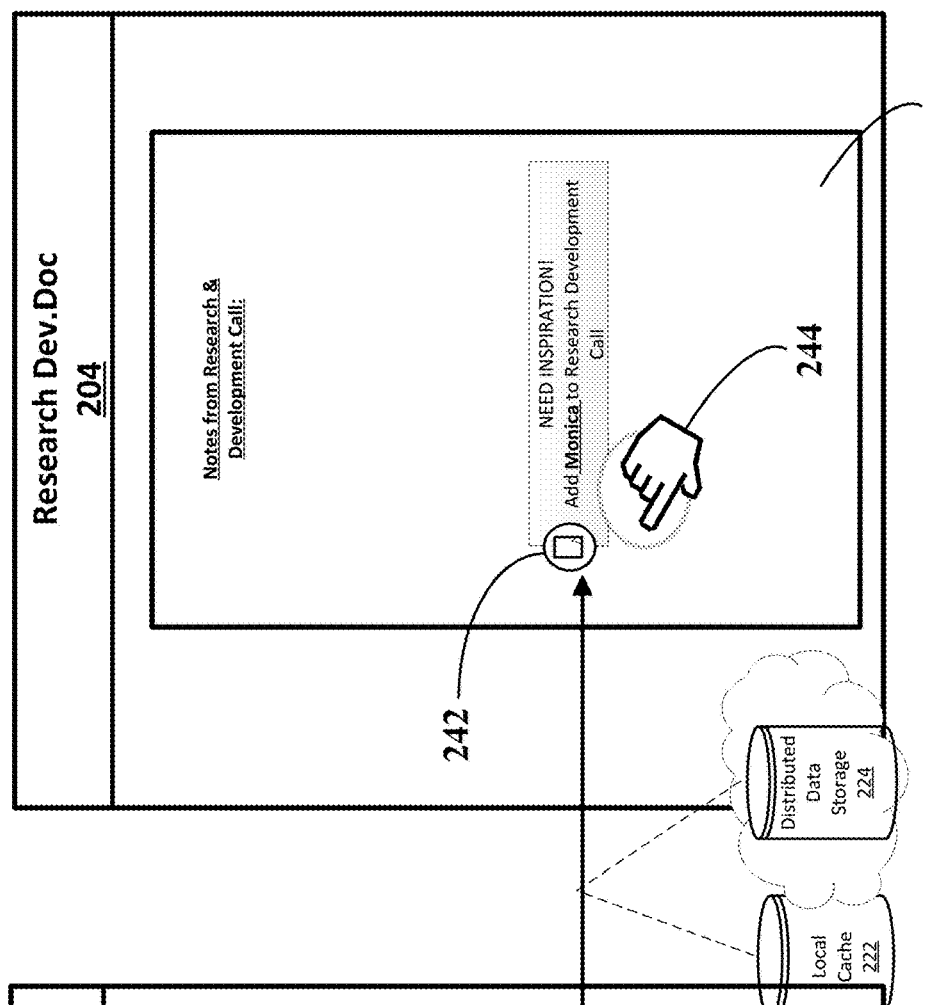
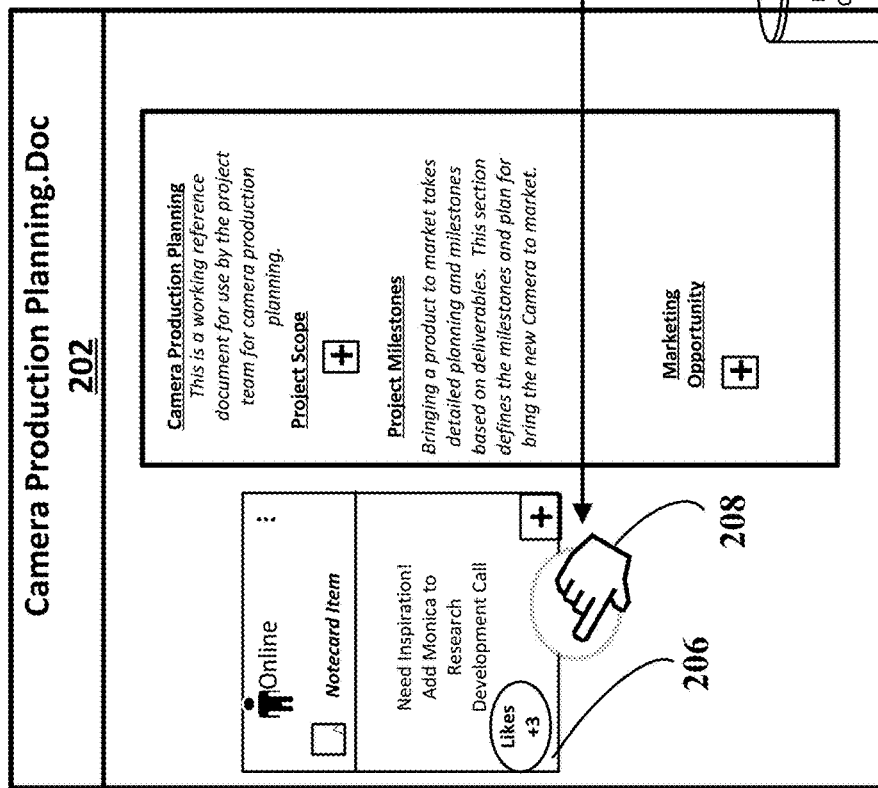
FIG. 2C
240

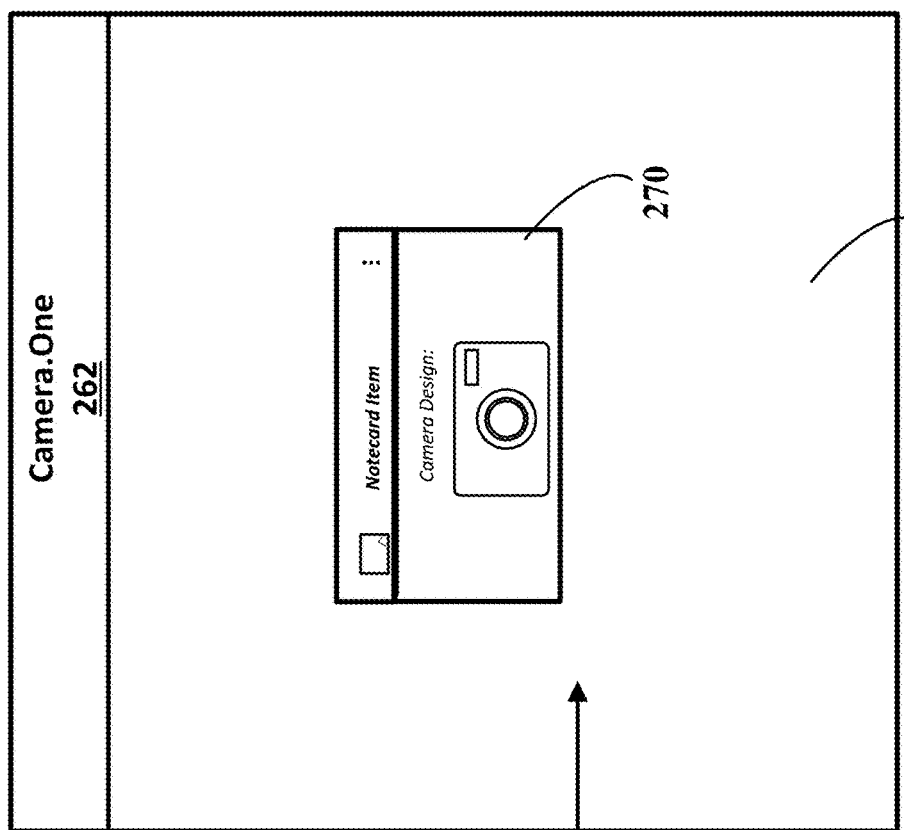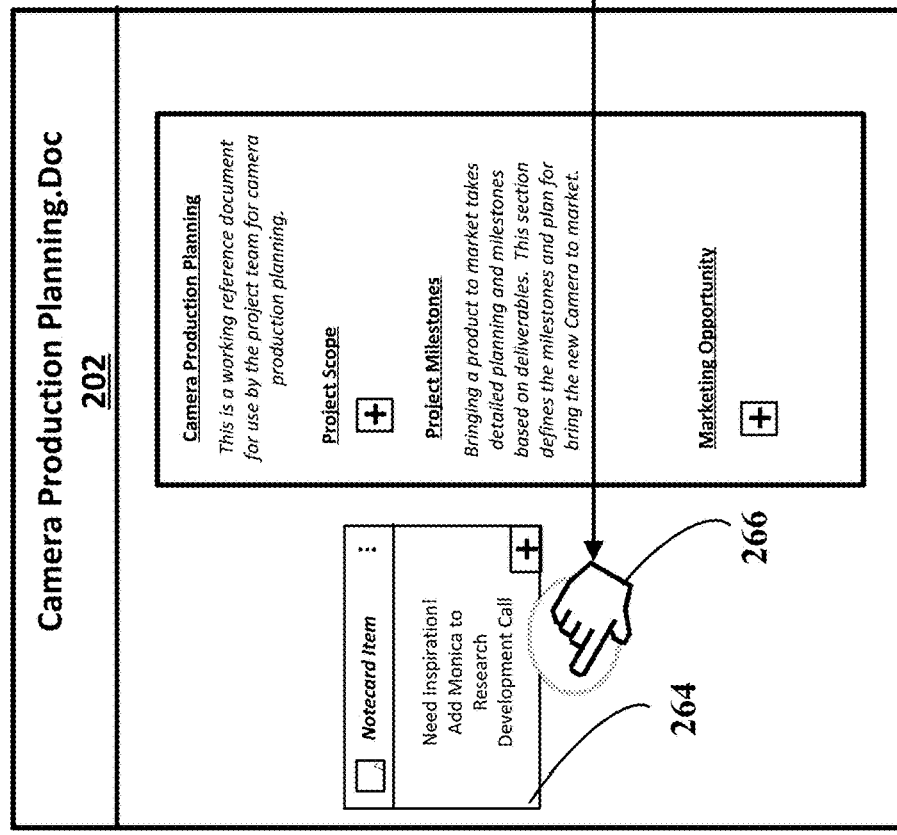
FIG. 2D

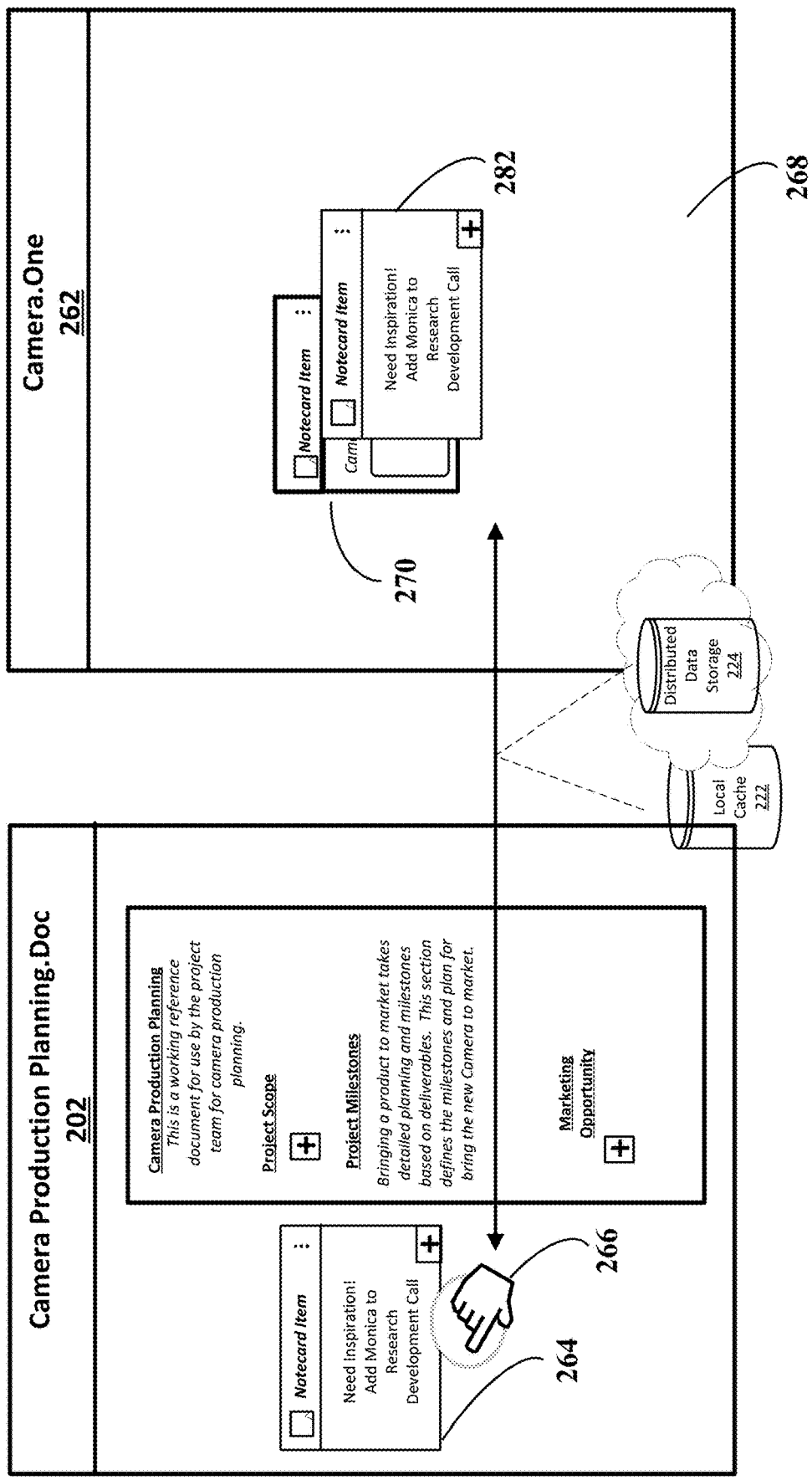

FIG. 2F
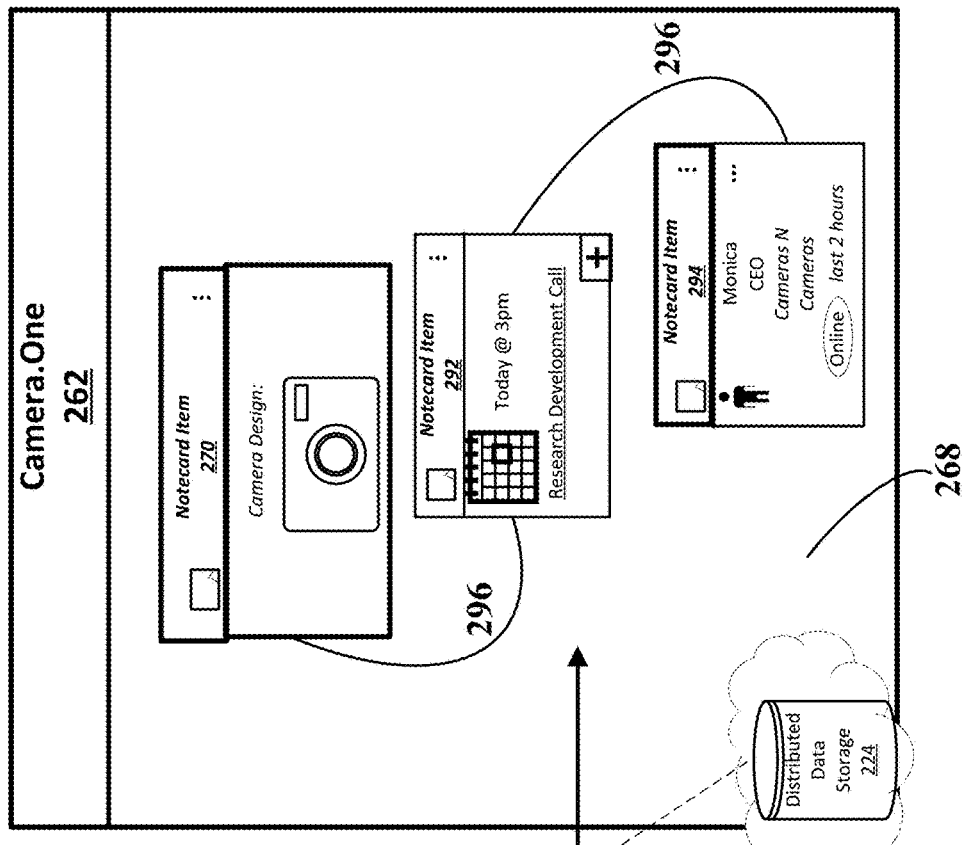
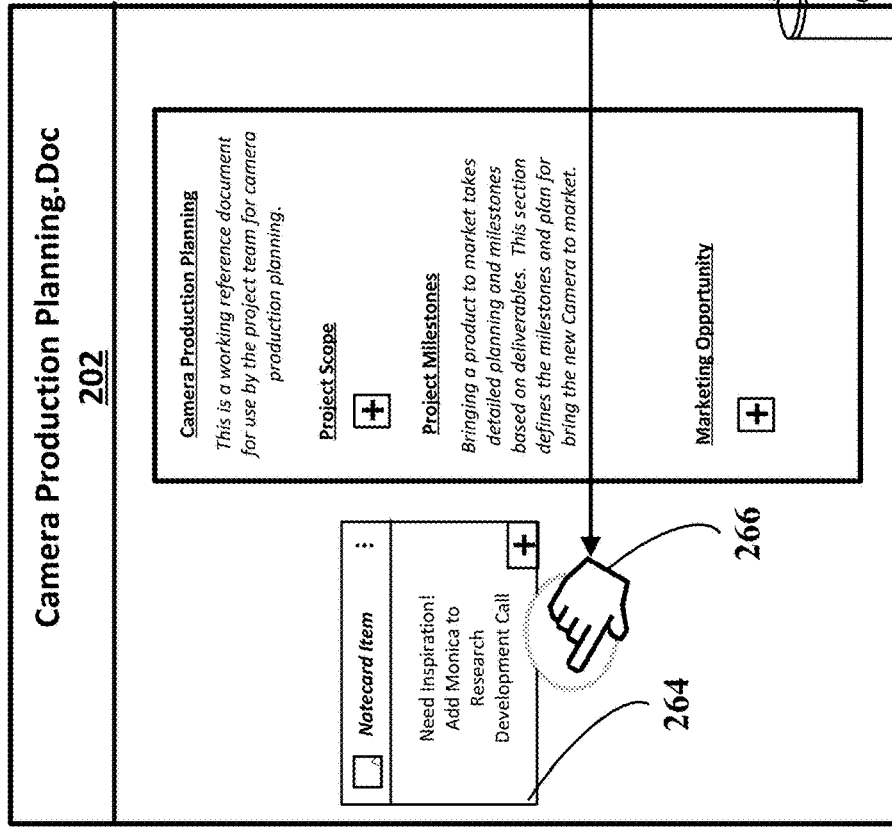

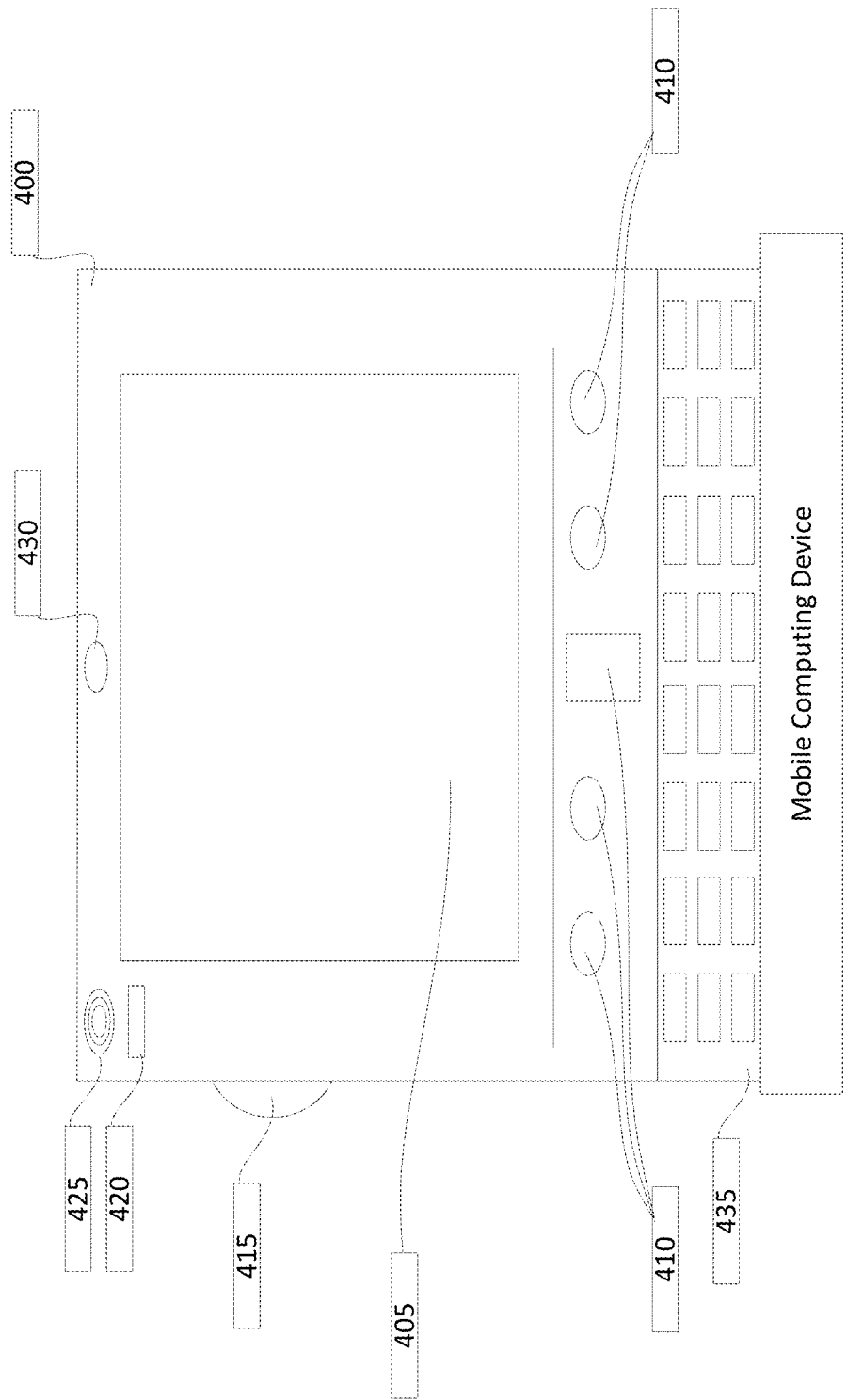

US 10,606,467 B2

FIDELITY MANAGEMENT AND TRANSFORMATION OF NOTECARD ITEMS

CROSS-REFERENCE TO RELATED APPLICATIONS

This application claims priority to U.S. Provisional Patent Application No. 62/628,813, entitled "FIDELITY MANAGEMENT AND TRANSFORMATION OF NOTECARD ITEMS", filed on Feb. 9, 2018, which is incorporated by reference herein in its entirety.

BACKGROUND

Current applications/service enable creation of electronic notes. However, an electronic note is typically tied to a specific digital document in which the electronic note was created. As an example, a user may create a review comment for content in a digital document but that review comment lives within the confines of the digital document. As such, electronic notes are traditionally specific to a digital document and not truly extensible for cross-application usage. From a technical perspective, traditional electronic notes are not adaptable to fit a context of another digital document, limiting usage and applicability.

Some applications enable users to create electronic notes (e.g., handwritten notes) that operate as separate data objects, which can be added to digital documents. However, such instances of electronic notes are treated as traditional data objects that comprise limited data and metadata for contextual relevance and cross-application usage. Many examples of such electronic notes do not even create a separate extensible data file for electronic notes. A common user interface example, illustrating this issue, is the case where a handwritten note is created and stored in association with a notes application/service, but a user has to manually access that electronic note (in another data repository) and manually recall a context in which the electronic note was created. Traditional electronic notes objects, when attached to a digital document, do not account for a context of the document in which the electronic note is being attached. Such electronic notes may be generally linked with a digital document without regard to a context in which a note is being used. Another technical issue related to the fidelity of electronic notes, where a traditional electronic note is not typically modifiable to account for a context in which an electronic note is being linked with a digital document.

SUMMARY

In view of the foregoing technical shortcomings, non-limiting examples of the present disclosure relate to fidelity management of an exemplary notecard item based on action(s) for movement that may re-locate notecard item(s) across any of: different content portions of a digital document, different digital documents of an application/service and digital documents of different applications/services. Specific data (and metadata) is collected and analyzed to enable determination of a level of fidelity for rendering of a notecard item, where a representation of a notecard item is generated to fit a context of a digital document in which the notecard item is being placed. A representation of a notecard item may be rendered at a first level of fidelity in one context but a different level of fidelity when the notecard item is moved to a different context. In other instances, evaluation of a notecard item yields a determination to maintain fidelity after an action that re-locates a notecard item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary method related to fidelity management of an exemplary notecard item based on action(s) for placement, with which aspects of the present disclosure may be practiced.

FIGS. 2A-2F illustrate exemplary processing device views associated with fidelity management of exemplary notecard items, with which aspects of the present disclosure may be practiced.

FIGS. 4A and 4B are simplified block diagrams of a mobile computing device with which aspects of the present disclosure may be practiced.

DETAILED DESCRIPTION

Figure 3:
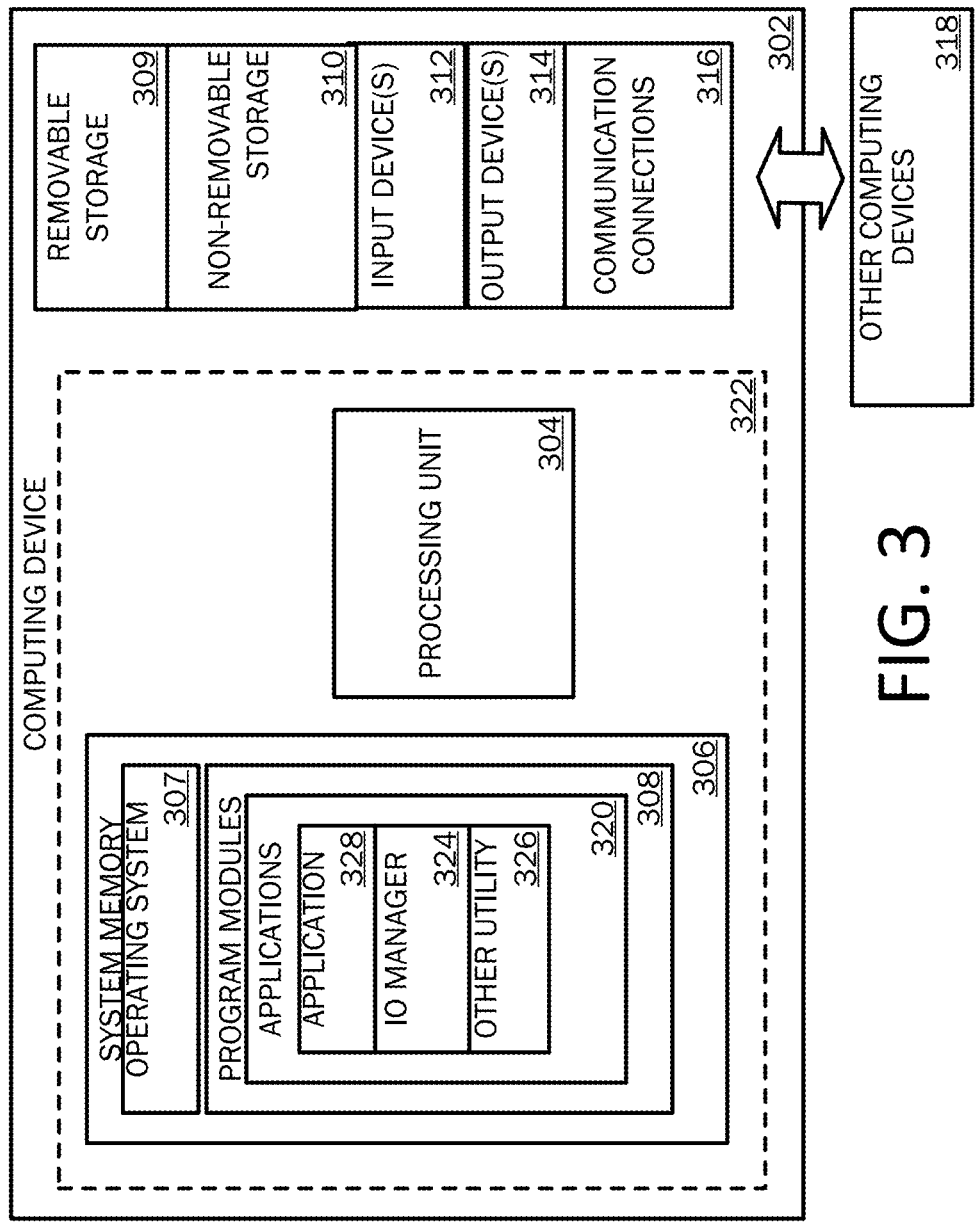
FIG. 3 is a block diagram illustrating an example of a computing device with which aspects of the present disclosure may be practiced.

Non-limiting examples of the present disclosure relate to fidelity management of an exemplary notecard item based on action(s) for movement that may re-locate notecard item(s) across any of: different content portions of a digital document, different digital documents of an application/service and digital documents of different applications/services. A notecard item is individual, self-contained digital data object that provides content to supplement a digital document. Exemplary notecard items live outside of an application/service, in which the notecard item is created or used, where a notecard item may be linked to a digital document but also exists as a separate object. An exemplary notecard item may comprise one or more data objects stored as a separate file from a digital document in which the notecard item is presented. Specific data (and metadata) may be collected and analyzed to enable determination of a level of fidelity for rendering of a notecard item, where a representation of a notecard item is generated to fit a context of a digital document in which the notecard item is being placed. For example, a user may execute one or more actions comprising but not limited to: drag and drop actions, copy and paste actions or the like. Contextual evaluation of such actions (including evaluation of exemplary notecard files for notecard items) may yield a determination as to how to present, from a fidelity standpoint, a notecard item in a user interface of an exemplary application/service. For example, an exemplary representation of a notecard item may be presented at one level of fidelity and when a context changes, the notecard item may be presented at another level of fidelity. Stored data associated with a notecard item enables modification of representations of the notecard item across different levels of fidelity based on contextual evaluation. In other instances, evaluation of a notecard item yields a determination to maintain a level of fidelity, for example, after an action that re-locates a notecard item. In such instances, a contextual evaluation of an action may still comprise evaluation of stored data associated with a notecard item.

Examples described herein differentiate from traditional copy and paste actions (or drag and drop actions) because applications/services are configured to evaluate stored data (and metadata) that is specific to an exemplary notecard item (or notecard items). An originally created notecard item (or representation of the notecard item) may be stored at a first level of fidelity but the notecard item may be later rendered at different level of fidelity that matches a context in which the notecard item is being placed. When content is dragged from a note card item into a destination digital document, the content and its formatting information is actually read from an exemplary notecard file for the notecard item. Examples described herein extend to instances where an entire notecard item is being re-located or specific portions of content from the notecard item is being re-located. This is feasible because notecard items (and related content) are stored separately from files associated with digital documents, which enables more efficient processing (at run-time or near run-time) for retrieval and modification of notecard items, among other technical advantages.

In one example, a notecard item may have been generated at an original level fidelity, which may not be apparent to a user because a representation of a notecard item presents the notecard item at a different level of fidelity. However, analysis of stored data (associated with an exemplary notecard file) enables an original representation of the notecard item to be quickly retrieved (or re-hydrated) when the notecard item is returned to an original context (or similar context to an original representation). For instance, an exemplary notecard file may store data (and metadata) for previous contextual uses of notecard items that may be utilized to quickly and efficiently render notecard items according to an appropriate context. In one example, a specific content portion may be dragged and dropped resulting in combination of one or more other data objects, where contextual evaluation of the drag and drop action may identify that the combination of data objects aligns with a previously created notecard item (or state of a created notecard item). This identification may be useful in re-surfacing a state of the created notecard item, where a user may not know that a created notecard item exists (or forgotten that one exists). Additionally, application-specific data (and/or metadata) may be associated with an exemplary notecard file that may provide indication of a preferred level of fidelity for rendering of notecard items when being re-located to specific applications/services.

Examples described herein are directed to working with created notecard items or content portions that are associated with created notecard items. Other related disclosures have been filed pertaining to creation of exemplary notecard items and service examples for management of notecard items. As referenced above, examples described herein may relate to cross-document usage as well as cross-application/service usage. As an example, created notecard items (and associated notecard files) may be managed by an exemplary notecard item management service. A notecard item management service extends functionality of applications/services (e.g., productivity services) that are configured to present notecard items through a user interface. For example, processing operations related to selection of a level of fidelity for presentation of a representation of notecard item may be executed by an exemplary notecard item management service. In other examples, an exemplary notecard item management service may be configured to interface with an application/service to extend functionality for selection of a level of fidelity and contextual representations of notecard items.

An exemplary notecard item management service may be configured to manage created notecard items and associations/links between notecard items. In some examples, links between notecard items may be visually emphasized in a graphical form (e.g., map of related ideas (between notecard items)). In such instances, an exemplary notecard item management service may be configured to access and evaluate notecard files (associated with notecard items), where data within the notecard files may be used to identify related notecard items, links between notecard items, etc. Graphical representation(s) of relationships between notecard items may be surfaced within an exemplary application/service thereby enhancing a user interface through the automatic provision of contextually relevant content (i.e. notecard items) including content that a user may not be presently aware of. This also improves productivity and efficiency of both client computing devices (e.g., data retrieval processing) as well as applications/services (e.g., improved user interface, cross-service usage and sharing of data) through surfacing of contextually relevant notecard items. An exemplary graphical representation may be organized based on any type of data associated with notecard files including keywords, timestamp data, user creation data, usage data, keywords, etc., as well as other classification data (e.g., categorical classification). Furthermore, as notecard items are added or modified, graphical representations may be updated/adapted in real-time (or near real-time).

In any instance, examples described herein enable exemplary notecard items to re-used or adapted for different contexts and cross-application (or cross-service) usage, thereby providing technical advantages including but not limited to: improving processing efficiency for applications/services in working with notecard items at run-time or near run-time; providing an adapted user interface that is configured for fidelity management of notecard items to improve operation of exemplary applications/services; achieving, through the adapted user interface, improved user interaction and productivity for users working with notecard items in exemplary application/services; improved processing efficiency for computing devices to recall previously created notecard items (including reduced latency in notecard item retrieval and presentation); improvements during operation of computing devices directed to processing efficiency (reduction in processing cycles) and better management of computer storage/memory during the management of states of notecard items and fidelity in generated representations thereof; cross-application/service enhancement including adaption and presentation for notecard items in a contextually relevant manner; and improved system/service examples that extend capabilities and functionality of associated applications/services, among other technical advantages.

FIG. 1 illustrates an exemplary method 100 related to fidelity management of an exemplary notecard item based on action(s) for placement, with which aspects of the present disclosure may be practiced. As an example, method 100 may be executed by an exemplary computing device (or computing devices) and/or system such as those shown in FIGS. 3-5. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. In one instance, processing operations described in method 100 may be implemented by one or more components connected over a distributed network.

Method 100 begins at processing operation 102, where an exemplary notecard item is presented through a user interface of an application/service. As an example, a representation of a notecard item may be surfaced through a user interface of an application/service (e.g., a productivity application/service). An exemplary productivity application/service is an application or service configured for execution to enable users to complete tasks on a computing device, where exemplary productivity services may be configured to work with notecard items (and interface with an exemplary notecard item management service). Examples of productivity services comprise but are not limited to: word processing applications/services, spreadsheet applications/services, notes/notetaking applications/services, authoring applications/services, digital presentation applications/services, digital assistant services, search engine applications/services, email applications/services, messaging applications/services, web browsing applications/services, collaborative team applications/services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other internet sources/services including third-party application/services, for example, to enhance functionality of the productivity service.

As an example, an exemplary notecard item may be presented (processing operation 102) in association with a digital document that is being surfaced through an application/service (e.g., productivity application/service). A digital document may comprise but is not limited to: an electronic file, website, social networking post, word documents, notes, documents, spreadsheet documents, blogs, etc. A digital canvas may be a workspace associated with a digital document that is provided through a user interface of an application/service. The digital canvas may comprise additional workspace bordering a main portion of workspace for a digital document. In other instances, an exemplary notecard item may be presented (processing operation 102) in a user interface of an application/service that is being accessed simultaneously with a productivity service in which a user is working on a digital document. For instance, an exemplary notecard item management service may be configured to present created notecard items (e.g., categorically, classification, based on relevance, timestamp data related to creation), which a user may utilize to enhance processing and productivity when working with exemplary digital documents. In one a user may execute action(s) that select an exemplary notecard item from a user interface of notecard item management service and re-locate the notecard item to a digital canvas, digital document, etc. In another instance, a user may be working with presented notecard items within an exemplary notecard item management service (e.g., re-categorizing them, adding content, notations).

Flow of method 100 may proceed to processing operation 104, where an action for movement/placement of a notecard item is received and processed. An exemplary action (or multiple actions) may be any interaction with a user interface of an exemplary application/service or input recognition through a computing device that initiates movement (re-location) of an exemplary notecard item. In one example, processing operation 104 may comprise receiving an action (or actions) that drag and drop content on a portion of the digital canvas (e.g. main workspace, additional workspace), which may be interpreted as a trigger for contextual evaluation of the action and association with an exemplary notecard item (or notecard items). Examples described herein are not limited to drag and drop actions and may comprise other similar actions such as copy and paste actions or the like. In another example, action(s) may comprise selections of different content portions within a digital document (or across different digital documents) that correspond to previously created notecard items. In one example, the one or more actions received comprise a drag and drop action that drags the notecard item from a first productivity service and drops the notecard item in a different productivity service. However, as referenced above, action(s) for movement of exemplary notecard items may re-locate notecard item(s) across any of: different content portions of a digital document, different digital documents of an application/service and digital documents of different applications/services. Further, in alternative examples, action(s) described herein extends to examples where specific content is associated with a notecard item or combined with other specific content that may be matched to a context state of a created notecard item (e.g., stored representation of a notecard item).

Flow may proceed to processing operation 106, where a context is determined for placement of the notecard item. As an example, processing operation 106 comprise determining a context for placement of the notecard item within a digital document of a productivity service. Exemplary determination of a context of for placement of a notecard item (or content related to a notecard item) comprises evaluation of signal data and an exemplary notecard file associated with a notecard item. In one example, contextual evaluation (processing operation 106) comprises analysis of: data within a notecard file for the notecard item; the digital document in which the notecard is being inserted; and application-specific data associated with a productivity service that is presenting the digital document. In further examples, contextual evaluation (processing operation 106) may further comprise comparison of created notecard items (e.g., data associated with notecard files for created notecard items), as managed by an exemplary notecard item management service.

An exemplary notecard file is persisted for created notecard items. At creation of an exemplary notecard item, a notecard file is persisted, in a data storage, to memorialize the notecard object as a separate data entity from other content that may be associated with a digital document. A notecard file may comprise data and metadata associated with a created notecard item as well as content portions/objects that are included in a notecard item. Notecard files are continuously updated. As an example, the notecard file may comprise one or more data objects that define the notecard item. Creation of notecard items including generation of exemplary notecard files has been described in other related patent applications. Examples formats for the one or more data objects of a notecard file comprise but are not limited to hyper-text mark-up language (HTML) blobs and JavaScript Object notation (JSON) objects, although a variety of formats are possible and may be considered within the scope of the present disclosure.

Further, exemplary notecard files are extensible to include data and metadata fields that are specific to working with notecard items and usage of notecard items (and data from notecard files) within specific productivity applications/services. Exemplary data objects such as HTML blobs enable developers to collect and define specific data relative to working with notecard items. For instance, data/metadata may be specific to determination of a state of a notecard item, levels of fidelity for representation of notecard items in different contextual instances and across different applications/services, created links between notecard items and digital documents and/or other notecard items, preferences for displaying notecard items in specific productivity applications/services, classification of notecard items (that an exemplary notecard item management service may utilize for categorization and retrieval of notecard items); and grouping/aggregating notecard items, among other examples. Whether notecard items or grouped together or not, each notecard item may be associated with its own notecard file for, among other benefits, improvement of management and recall of created notecard items. While notecards items are associated with notecard files, examples described herein are configured to automatically occur on behalf of a user without a user having to separately management notecard files other than through usage within applications/services.

As referenced above, an exemplary notecard file is persisted (processing operation 106) in a data storage. Contextual evaluation (processing operation 106) may comprise accessing stored data associated with a notefile file for a notecard item that is involved in a movement action. One example of a data storage is a distributed data storage that is associated with an exemplary notecard item management service. An exemplary notecard item management service extends functionality of exemplary applications/services (e.g., productivity services) that are configured to present notecard items through a user interface. A notecard item management service is configured to interface with exemplary applications/services (e.g., productivity services) to enable creation of notecard files (for notecard items) as well as management of created notecard items. Notecard files may be stored and indexed in repositories (e.g., user-specific repositories) of an exemplary distributed data storage, similar to email mailboxes, and in a format suitable for indexing and searching. While the repositories may be user-specific, they may also be organized on a per-group or per-team basis or in some other manner. Another example of a data storage is a local cache, of a computing device executing an application/service (e.g., productivity service) that is creating the notecard item. Exemplary notecard items may be surfaced in a user interface of a productivity service from a notecard file stored in a local cache or in a distributed data storage. An exemplary notecard item management service is further configured to synchronize versions of notecard files that may be stored locally and those which are maintained on a distributed data storage.

In processing operation 106, exemplary contextual evaluation of an action (and corresponding data/metadata) may be executed by an exemplary notecard item management service or a productivity application/service interfacing with the notecard item management service, among other non-limiting examples. Signal data may be collected and analyzed to determine a context for an action that places an exemplary notecard item in a digital document.

Signal data may comprise but is not limited to: device-specific data, application-specific data, user-specific data, etc. Examples of device-specific data comprise but are not limited to: timestamp data; geo-locational data; account sign-in data; processing state at the time of receipt of an exemplary action (including applications/services, documents, etc. being accessed); and device modality for access to an exemplary application/service, among other examples. Examples of application-specific data comprise but are not limited to: signal data from digital documents including analysis of data and metadata associated with digital documents; user actions received through applications/services including action for movement/placement of the notecard item and subsequent actions to add content to a notecard item; application data (including telemetric data) collected by an exemplary application/service; signal data related to cross-application usage; and signal data related to application/service preferences for display of notecard items, among other examples. Examples of user-specific data comprise but are not limited to: signal data related to user account login (e.g., to a service or platform of productivity services); signal data related to user profile, preference or user-specific themes; and determination of user intent (e.g., semantic analysis of action(s), user preferences, user history for a specific user or group of users), among other examples. Collection and analysis of exemplary signal data is known to one skilled in the field of art. Processing operation 106, comprises analyzing the signal data associated with the or more actions (e.g., the collective context surrounding the action(s) for notecard creation), which can be utilized for to assist with determination of a level of fidelity for presentation of notecard item.

Additionally, processing operation 106 comprises evaluation of data (and metadata) associated with a created notecard file for an exemplary notecard item. An exemplary notecard file may comprise data specific to an exemplary notecard item that is useful for determining a level of fidelity to present a representation of a notecard item. Examples of data and metadata that may be analyzed for fidelity determinations comprise but are not limited to: data related to state of creation of an exemplary notecard item including previous states, layouts and formatting and content types; arrangement of content within an exemplary notecard representation; links and associations of notecard data; classification and categorization of (e.g., by an exemplary notecard item management service); and application-specific preferences for representation of a notecard items within a specific application/service (e.g., productivity service).

Moreover, contextual evaluation (processing operation 106) may correlate data associated with a digital document with the notecard item(s) that are involved in an exemplary action. For example, signal data associated with an exemplary digital document may be collected and analyzed including but not limited to: data (and metadata) associated with a digital document, content types, formatting, layout, positioning of data objects/content portions, grouping of data objects, links and associations (including other related notecard items), among other examples. Such data may be useful to select a most appropriate level of fidelity for representation of the notecard item.

In one example, determination of context comprises a determination that the notecard item is being placed on top of another notecard item. This may ultimately result in a selection of a level of fidelity for a notecard item that corresponds to a stacked or grouped representation of the notecard item. As an example, a result of processing may modify, a state of the notecard item by one or more of: a size of content associated with the notecard item, a formatting of content associated with the notecard item, removal of content from the notecard item and addition of content to the notecard item.

In another example, a determination of context (processing operation 106) comprises a determination that the one or more actions combine the notecard item with a portion of content of the digital document. This may ultimately result in a selection of a level of fidelity for a notecard item that generates and displays two or more notecard items, for example, based on a combination of the notecard item with the portion of content. In other words, evaluation of context associated with the action yields a determination that content of a notecard item is to be broken out into a plurality of notecard items to improve usability and user interaction with an exemplary productivity service.

Flow of method 100 may proceed to processing operation 108, where a level of fidelity is selected for display of an exemplary notecard item (or representation of a notecard item). As referenced above, selection (processing operation 108) of a level of fidelity is based on results of the determined contextual evaluation related to the action, notecard items involved in the action and a state of a digital document in which the notecard item is being placed. In one example, an exemplary data model may be executed that evaluates signal data (as described above) as input and generates a determination as to a level of fidelity of the notecard item based on results of the signal data analysis. Generation and application of an exemplary data model including specific inputs, outputs, building of feature maps and ranking/scoring operations, are known to one skilled in the field of art. In some examples, specific levels of fidelity may be preset, by developers, that align with results of signal data analysis. For example, a determined context may identify that that a notecard is being dragged and dropped in a specific productivity service, resulting a preset representation of the notecard item. Data used in such a determination may further be associated with an exemplary notecard file for a notecard item. In other instances, developers may code the preset guidelines for selection of a level of fidelity without requiring a data model to be executed to select the level of fidelity for representation of the notecard item.

In one example, selection (processing operation 108) of the level of fidelity further comprises a determination to maintain a level of fidelity of the notecard item when inserted into the digital document of the productivity service. At a time of presentation, a representation of the notecard item is presented at same level of fidelity as is displayed in another content portion, another digital document, user interface, etc.

In another example, selection (processing operation 108) of the level of fidelity for display of the notecard item comprises modifying the notecard item to fit a context of the digital document. At a time of presentation, a representation of the notecard item presents a modified notecard item as compared to another representation of the notecard item that is displayed in another content portion, another digital document, user interface, etc.

Flow of method 100 may proceed to processing operation 110, where a representation of the notecard item is presented in a digital document. As an example, processing operation 110 may present the representation of the notecard item in a digital document of a productivity service based on the selected level of fidelity determined in processing operation 108.

Flow of method 100 may proceed to decision operation 112, where it is determined whether subsequent action is received for placement of the representation of notecard item. If subsequent action for placement of the representation of the notecard item is not received, flow of decision operation 112 branches NO and processing of method 100 remains idle until subsequent processing is received. As an example, a second drag and drop action (or similar action) may be received that drags the notecard item from a productivity service and drops the notecard item back to an original productivity service from which it was previously represented. As a result, processing of decision operation 112 may branch YES and processing of method 100 returns back to processing operation 104 where the subsequently received action(s) is evaluated. In that instance, as referenced above, selection of the level of fidelity may comprise returning the notecard item to an original representation (previous context states) as presented in the original productivity service. In other instances where the representation of the content item is re-located to another content portion, digital document or productivity service, subsequent processing operations may determine whether to maintain (or modify) a level of fidelity of the representation of the notecard item.

FIGS. 2A-2F illustrate exemplary processing device views associated with fidelity management of exemplary notecard items, with which aspects of the present disclosure may be practiced. FIGS. 2A-2F illustrate front-end user interface examples of processing operations described in the foregoing description including method 100 (FIG. 1).

FIG. 2A illustrates processing device view 200, providing visual indication of receipt of action(s) 208 that re-locates (copies, moves, etc.) an exemplary notecard item 206 from a first digital document to a second digital document. For instance, a non-limiting example of the action(s) 208 is a drag and drop action(s), copy and paste action(s) or the like. In the example shown in processing device view 200, the first and second digital documents are associated with the same productivity service (e.g., a word processing service). For instance, notecard item 206 is being dragged from a first digital document 202 (Camera Production Planning.doc) to a digital canvas 210 in a second digital document 204 (Research Dev.doc) of a word processing service.

FIG. 2B illustrates processing device view 220, providing a continued example that illustrates results of processing the action(s) 208 shown in processing device view 200. As a result of the action(s) 208, a representation 226 of the notecard item 206 is presented on the digital canvas 210 of the second digital document 204. As referenced in the foregoing description, an exemplary notecard file, that is persisted for an exemplary notecard item, may be accessed and evaluated to assist with determination of a level of fidelity for generation of the representation 226 of the notecard item 206. Generation of the representation 226 of the notecard item 206 may occur based on determination of a context associated with action 208 and a corresponding selection of a level of fidelity for the representation 226. Data associated with a notecard file (for a notecard item) may be accessed from one or more of a local cache 222 and a distributed data storage 224, as described in the foregoing examples. In the example shown, evaluation of the action(s) and associated signal data comprises a determination that a same level of fidelity should be displayed (maintained) from the original representation of the notecard item 206. For instance, contextual factors that may attribute to determination to maintain a level of fidelity for notecard item comprise but are not limited to: the productivity service being the same, the digital canvas 210 being blank (and having enough space to display a full representation of the notecard item), similarities in the formatting of the first digital document 202 and the second digital document 204, contextually relevance of content of the notecard item to that of the second digital document 204 and preset application/service preferences for display of notecard items (that may be associated with a notecard file), among other examples.

FIG. 2C illustrates processing device view 240, providing an alternative example that illustrates results of processing the action(s) 208 shown in processing device view 200. In the example shown, as compared with the example provided in processing device view 220 (FIG. 2B), the representation of the notecard item 242 has a different level of fidelity from that of the original representation of the notecard item 206. Generation of the representation 242 of the notecard item 206 may occur based on determination of a context associated with action 208 and a corresponding selection of a level of fidelity for the representation 242. Representation 242 of notecard item 206 illustrates an alternative result of contextual evaluation of action 208 as compared with that of processing device view 220 (FIG. 2B). As an example, a user interface feature for the notecard item may be surfaced in representation 242, that may enable a user to expand view of richer formatting of the notecard item, for example, to modify presentation to the original representation of notecard item 206. Further, in processing device view 240, the representation 242 emphasizes content of the original notecard item 206, for example, modifying a formatting and layout of content of the notecard item to best fit a context for insertion/placement on the canvas 210 of the second digital document 204. Additionally, as shown in representation 242, a link for a contact "Monica" is emphasized for user selection. The original notecard item 206 comprises text that mentions a name (Monica) and evaluation of signal data associated with the notecard item 206 (including user access, user groups/associations, etc.) may lead to enhancement of the notecard item 206, for example, in subsequent representations of an exemplary notecard item.

FIG. 2D illustrates processing device view 260, providing an example of receipt of action(s) 266 that drags a notecard item 264, from a first digital document 202 (in a first productivity service-word processing service), and drops the notecard item 264 in a second digital document 262 of a different application/service (e.g., second productivity service-notetaking service). The second digital document 262 (Camera.One-document of a notetaking service) comprises a digital canvas 2698 that includes an existing notecard item 270. The existing notecard item 270 includes image content pertaining to a camera design. In the example shown, an action 266 (e.g., drag and drop action(s)) selects the notecard item 264 from the digital document 202 of a first productivity service and places the notecard item 264 within a digital canvas 268 of a a digital document 262 in a different productivity service.

FIG. 2E illustrates processing device view 280, providing a continued example that illustrates results of processing the action(s) 266 shown in processing device view 260. As shown in processing device view 280, representation 282 correlates with a selected level of fidelity of the notecard item 264 that groups/stacks the notecard items. For example, the action 266 may have dragged and dropped the notecard item on top of the original notecard item 270 of the digital canvas 268. A contextual evaluation of the action 266, including evaluation of the notecard file and the respective digital documents, may yield a determination that displays the result of the action 266 as shown in processing device view 280. For instance, a representation 282 of the notecard item 264 is stacked over the original notecard item 270 of the second digital document 262. In alternative examples, contextual evaluation of action 266 may yield determination to present the representation 282 alongside of the original notecard item 270 (of digital document 262) or combine content the original notecard item 270 and notecard item 264 (into one or more notecard items), among other examples. For example, refer to FIG. 2F (processing device view 290) for an alternative contextual representation.

FIG. 2F illustrates processing device view 290, providing an alternative example that illustrates results of processing the action(s) 266 shown in processing device view 260. In the example shown in processing device view 290, a selected level of fidelity comprises generation of a representation 296 that creates multiple new notecard items for a contextual representation of the original notecard item 270 (of digital document 262) and notecard item 266 (of digital document 202). For instance, an evaluation of context associated with the action(s) 266 may determine to maintain a representation of notecard item 270, and break out content of notecard item 266 into into multiple associated notecard items 292 and 294, respectively. Additionally, processing device view 290 provides visual illustration depicting association of the representations of notecard items 270, 292 and 294 by providing user interface links 296 between the notecard items. The user interface links 296 is a non-limiting example of how association may be displayed for created representations of notecard items.

Figure 4B:
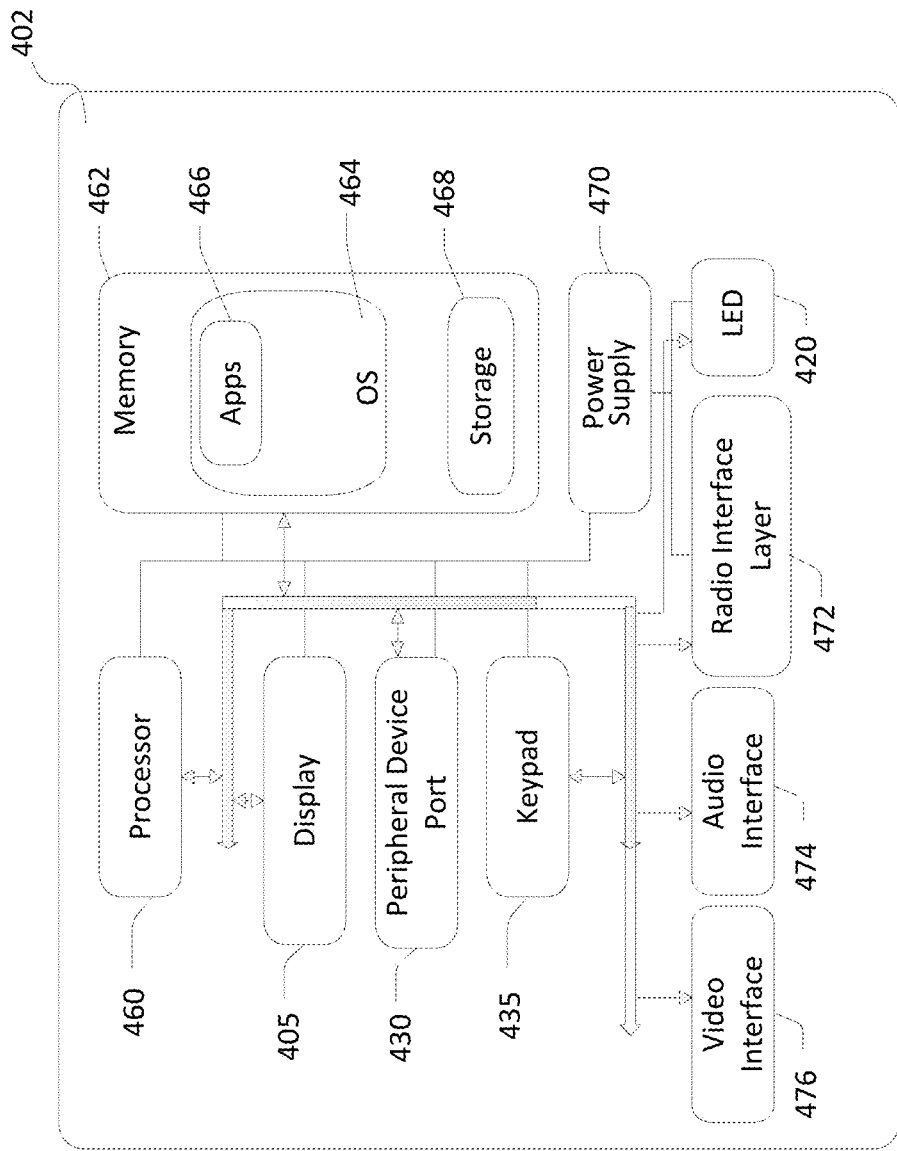
Figure 5:
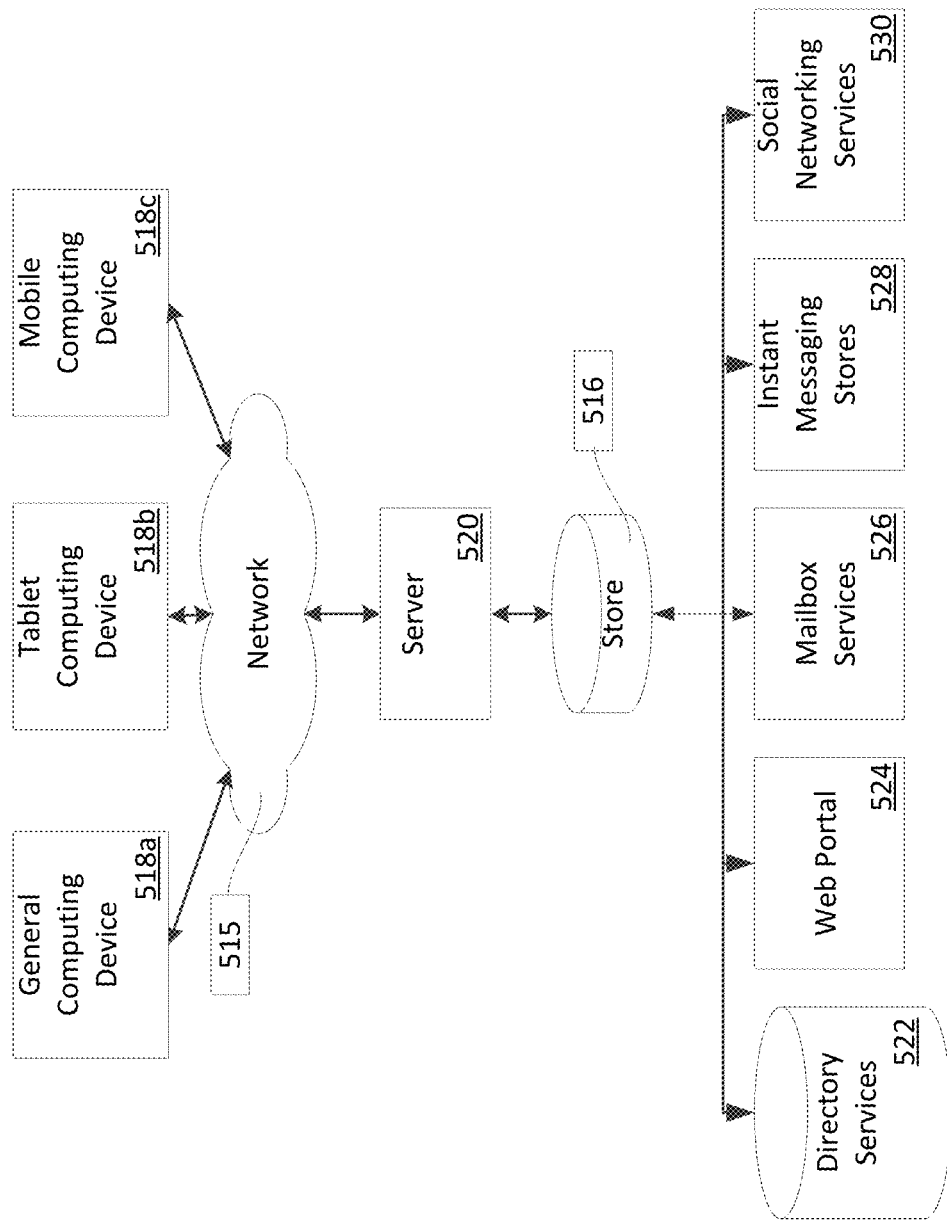
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for fidelity management of exemplary notecard items based on action(s) for placement (e.g., re-location of an exemplary notecard item) as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for fidelity management of exemplary notecard items based on action(s) for placement (e.g., re-location of an exemplary notecard item) as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for fidelity management of exemplary notecard items based on action(s) for placement (e.g., re-location of an exemplary notecard item) as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein.

A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   presenting, through a user interface, a notecard item;
   receiving one or more actions associated with movement of the notecard item, wherein the one or more actions combine the notecard item with a portion of content of a digital document;
   determining a context for placement of the notecard item within the digital document of a productivity service, wherein a determination of the context for placement of the notecard item comprises analysis of: data within a notecard file for the notecard item, the digital document in which the notecard is being inserted and application-specific data associated with the productivity service;
   selecting a level of fidelity for display of a representation of the notecard item based on the determined context, wherein the selecting of the level of fidelity comprises a determination as to a number of notecard items to generate in the representation of the notecard item based on a combination of the notecard item with the portion of content; and
   presenting, within the digital document of the productivity service, the representation of the notecard item based on the selected level of fidelity.

2. The method of claim 1, wherein the selecting of the level of fidelity further comprises a determination to maintain a level of fidelity of the notecard item when inserted into the digital document of the productivity service, and wherein presenting further comprises inserting the representation of the notecard item at a same level of fidelity as the first representation of the notecard item.

3. The method of claim 1, wherein the selecting of the level of fidelity for display of the notecard item comprises modifying the notecard item to fit a context of the digital document, and wherein the presenting presents, as the representation, the modified notecard item.

4. The method of claim 3, wherein the one or more actions comprise a drag and drop action that drags the notecard item from a first productivity service and drops the notecard item in the productivity service, being a second productivity service that is different from the first productivity service.

5. The method of claim 4, further comprising: receiving a second drag and drop action that drags the notecard item from the second productivity service and drops the notecard item in the first productivity service, wherein the selecting of the level of fidelity comprises returning the notecard item to an original representation as previously presented in the first productivity service.

6. The method of claim 1, wherein the determining of the context comprises a determination that the notecard item is being placed on top of another notecard item, wherein the selecting of the level of fidelity further comprises generating, from analysis of the data of the notecard file, the representation of the notecard item that is tailored for stacking the notecard item with the other notecard item, and wherein the representation of the notecard item comprises a modification selected from one or more of: a size of content associated with the notecard item, a formatting of content associated with the notecard item, removal of content from the notecard item and addition of content to the notecard item.

7. The method of claim 1, wherein the selecting of the level of fidelity comprises a determination to generate two or more notecard items based on a combination of the notecard item with the portion of content, and wherein the representation, presented within the digital document, comprises surfacing of the two or more notecard items.

8. A system comprising:
   at least one processor; and
   a memory, operatively connected with the at least one processor, storing computer-executable instructions that, when executed by the at least one processor, causes the at least one processor to execute a method that comprises:
   presenting, through a user interface, a notecard item;
   receiving one or more actions associated with movement of the notecard item, wherein the one or more actions combine the notecard item with a portion of content of a digital document;
   determining a context for placement of the notecard item within the digital document of a productivity service, wherein a determination of the context for placement of the notecard item comprises analysis of: data within a notecard file for the notecard item, the digital document in which the notecard is being inserted and application-specific data associated with the productivity service;
   selecting a level of fidelity for display of a representation of the notecard item based on the determined context, wherein the selecting of the level of fidelity comprises a determination as to a number of notecard items to generate in the representation of the notecard item based on a combination of the notecard item with the portion of content; and presenting, within the digital document of the productivity service, the representation of the notecard item based on the selected level of fidelity.

9. The system of claim 8, wherein the selecting of the level of fidelity further comprises a determination to maintain a level of fidelity of the notecard item when inserted into the digital document of the productivity service, and wherein presenting further comprises inserting the representation of the notecard item at a same level of fidelity as the first representation of the notecard item.

10. The system of claim 8, wherein the selecting of the level of fidelity for display of the notecard item comprises modifying the notecard item to fit a context of the digital document, and wherein the presenting presents, as the representation, the modified notecard item.

11. The system of claim 10, wherein the one or more actions comprise a drag and drop action that drags the notecard item from a first productivity service and drops the notecard item in the productivity service, being a second productivity service that is different from the first productivity service.

12. The system of claim 11, wherein the method, executed by the at least one processor, further comprises: receiving a second drag and drop action that drags the notecard item from the second productivity service and drops the notecard item in the first productivity service, and wherein the selecting of the level of fidelity comprises returning the notecard item to an original representation as previously presented in the first productivity service.

13. The system of claim 8, wherein the determining of the context comprises a determination that the notecard item is being placed on top of another notecard item, wherein the selecting of the level of fidelity further comprises generating, from analysis of the data of the notecard file, the representation of the notecard item that is tailored for stacking the notecard item with the other notecard item, and wherein the representation of the notecard item comprises a modification selected from one or more of: a size of content associated with the notecard item, a formatting of content associated with the notecard item, removal of content from the notecard item and addition of content to the notecard item.

14. The system of claim 8, wherein the selecting of the level of fidelity comprises a determination to generate two or more notecard items based on a combination of the notecard item with the portion of content, and wherein the representation, presented within the digital document, comprises surfacing of the two or more notecard items.

15. A computer-readable storage medium storing computer-executable instructions that, when executed by at least one processor, causes the at least one processor to execute a method comprising:
  presenting, through a user interface, a notecard item;
  receiving one or more actions associated with movement of the notecard item, wherein the one or more actions combine the notecard item with a portion of content of a digital document;
  determining a context for placement of the notecard item within the digital document of a productivity service, wherein a determination of the context for placement of the notecard item comprises analysis of: data within a notecard file for the notecard item, the digital document in which the notecard is being inserted and application-specific data associated with the productivity service;
  selecting a level of fidelity for display of a representation of the notecard item based on the determined context, wherein the selecting of the level of fidelity comprises a determination as to a number of notecard items to generate in the representation of the notecard item based on a combination of the notecard item with the portion of content; and
  presenting, within the digital document of the productivity service, the representation of the notecard item based on the selected level of fidelity.

16. The computer-readable storage medium of claim 15, wherein the selecting of the level of fidelity further comprises a determination to maintain a level of fidelity of the notecard item when inserted into the digital document of the productivity service, and wherein presenting further comprises inserting the representation of the notecard item at a same level of fidelity as the first representation of the notecard item.

17. The computer-readable storage medium of claim 15, wherein the selecting of the level of fidelity for display of the notecard item comprises modifying the notecard item to fit a context of the digital document, and wherein the presenting presents, as the representation, the modified notecard item.

18. The computer-readable storage medium of claim 17, wherein the one or more actions comprise a drag and drop action that drags the notecard item from a first productivity service and drops the notecard item in the productivity service, being a second productivity service that is different from the first productivity service.

19. The computer-readable storage medium of claim 18, wherein the executed method further comprising: receiving a second drag and drop action that drags the notecard item from the second productivity service and drops the notecard item in the first productivity service, wherein the selecting of the level of fidelity comprises returning the notecard item to an original representation as previously presented in the first productivity service.

20. The computer-readable storage medium of claim 15, wherein the selecting of the level of fidelity comprises a determination to generate two or more notecard items based on a combination of the notecard item with the portion of content, and wherein the representation, presented within the digital document, comprises surfacing of the two or more notecard items.

* * * * *